United States Patent [19]

Sasagawa et al.

[11] Patent Number: 4,529,684
[45] Date of Patent: Jul. 16, 1985

[54] COMPOSITION SUITABLE FOR USE IN THE PRODUCTION OF LASER BEAM RECORDING/READING MEANS

[75] Inventors: Katsuyoshi Sasagawa; Eiichi Noda; Masao Imai, all of Yokohama, Japan

[73] Assignee: Mitsui Toatsu Chemicals, Incorporated, Tokyo, Japan

[21] Appl. No.: 671,790

[22] Filed: Nov. 15, 1984

Related U.S. Application Data

[63] Continuation-in-part of Ser. No. 457,080, filed as PCT JP 82/00002, Jan. 6, 1982, published as WO 83/02428, Jul. 31, 1983, § 102(e) date Dec. 22, 1982, abandoned.

[51] Int. Cl.$^3$ ................................................ G03C 5/00
[52] U.S. Cl. .................................... 430/269; 430/363; 430/495; 430/945; 346/1.1
[58] Field of Search ................ 430/1, 2, 341, 363, 430/495, 945, 269; 260/439 R; 346/76 L, 1

[56] References Cited

U.S. PATENT DOCUMENTS 4,050,938  9/1977  Smith et al. ........................ 430/581
4,268,605  5/1981  Hara et al. ......................... 430/551
4,320,489  3/1982  Crandall et al. .................. 346/76 L

FOREIGN PATENT DOCUMENTS 28114   9/1979  Japan .
56533  12/1983  Japan .

OTHER PUBLICATIONS

Baker-Hawkes et al., Journal Amer. Chem. Soc., vol. 88, pp. 4870–4875, 1966.

Primary Examiner—J. Travis Brown
Attorney, Agent, or Firm—Fisher, Christen & Sabol

[57] ABSTRACT

A composition obtained by incorporating a benzenedithiol nickel complex in a liquid formulation containing a solvent and, as a binder, an organic polymer or containing a solvent, organic color-producing substance, acidic substance and binder suitable for producing a laser beam recording/reading means having an absorption band in the region of 800–950 nm.

2 Claims, 1 Drawing Figure

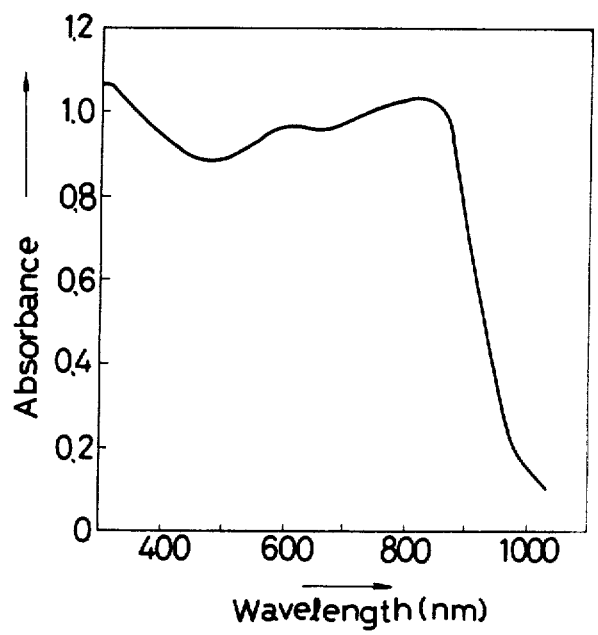

COMPOSITION SUITABLE FOR USE IN THE PRODUCTION OF LASER BEAM RECORDING/READING MEANS

This is a continuation of application Ser. No. 457,080, filed as PCT JP 82/00002, Jan. 6, 1982, published as WO 83/02428, Jul. 31, 1983, § 102(e) date on Dec. 22, 1982, now abandoned.

TECHNICAL FIELD

This invention relates to a composition suitable for use in the production of a laser beam recording/reading means. More specifically, this invention relates to a composition suitable for use in the production of a laser beam recording/reading composition having an absorption band in the region of 800–950 nm, which composition contains a benzenedithiol nickel complex in a liquid formulation of a solvent and, as a binder, an organic polymer or in a liquid formulation of a solvent, organic color-producing substance, acidic substance and organic polymer.

BACKGROUND ART

With the recent increase in the volume of information, there are ever-increasing commercial demands for increased speed and savings in material and manpower in the processing of such information. Information recording/reading technology is not an exception. A variety of recording/reading systems and improvements thereto have been put into practice.

The recording system employed in the information recording/reading technology will first be described hereinafter. The heat-sensitive recording system making use of heat or hot wires has found particularly widespread commercial utility. The heat-sensitive recording system includes (1) the hot pen system employed in the recording devices of medical analyzers; (2) the thermal head system incorporated in facsimiles, computer terminal equipment, and printers of desk-top electronic calculaters; and (3) the reflex baking system adopted in office copying machines. In each of the above systems, a heating element is brought into contact with heat-sensitive recording layers. As a result, there is unavoidable limitation to the resolution and recording speed due to the limited heat capacity of each heating element and the way of heat conduction.

With a view toward overcoming such drawbacks, a variety of heat mode recording systems have been proposed. These new recording systems make use of laser beams. Different from the conventional heat-sensitive recording systems, the laser beam recording system carries out recording without need for any direct contact between heating element and heat-sensitive recording layers. Hence, the laser beam recording system is free from the limitations stemming from the limited heat capacity of the heating element, the way of heat conduction, the limited size of the heating element in view of its machining, thereby permitting high-speed and high-density recording.

Roughly speaking, the laser heat mode recording system may be put to practice in two different ways. According to the first recording system, a difference in optical density is produced between a laser-irradiated spot and a laser-unirradiated spot by irradiating a laser beam onto a thin film-like recording means carried on a substrate such as film or the like to thermally excite the recording means at the irradiated spot, to induce fusion, evaporation or sublimation of the recording means, and to make the color of the spot extremely light or colorless. As thin film-like recording means useful in the practice of the first system, it has been proposed to use metals, organic polymers and coloring substances as materials to be fused, evaporated or sublimated. Among such recording means, metallic recording means are (1) expensive because a metal such as bismuth or indium has to be formed into a thin film on a substrate by the sputtering or vacuum evaporation method; and (2) accompanied by a low utilization efficiency of laser beam energy since many of such metallic recording means have a high reflectivity to laser beams. Correspondingly, metallic recording means require laser beams of a large output, whereby making the apparatus larger. They are thus not advantageous from the viewpoint of economy. On the other hand, a recording means using an organic polymer or coloring substance permits carrying out recording with laser beams of low energy since it has a low degree of thermal conductivity and a low sublimation temperature. However, a recording means making use of a polymer only has not yet succeeded in lowering to a satisfactory level the energy of laser beams required to perform the recording. Under the circumstances, it is still required to use a coloring substance having a strong capacity to absorb laser beams and converting them into heat, in combination with a polymer. Coloring substances of the above sort are required to have such a nature that they absorb heat and undergo fusion, evaporation or sublimation. As coloring substances having such a nature, there have heretofore been found blue and bluish as well as green and greenish coloring substances such as "Methylene Blue" and "Brilliant Green" for helium-neon laser beams, and red and reddish coloring substances such as "Ethyl Red" for argon laser beams. However, these coloring substances need gas laser beams, leading to large apparatus. Consequently, use of such coloring substances is not fully economical.

Accompanied with the rapid advance of semiconductor laser in recent years, it has become feasible to employ such semiconductor lasers as light sources for the recording systems of the aforementioned kind. However, no coloring substance has yet been found to be suitable for semiconductor laser beams. Carbon black and the like have been proposed, but they cannot provide high sensitivity due to their inherent particle shapes. Thus, there is a strong demand for the development of coloring substances suitable for semiconductor laser beams.

On the other hand, as the second laser heat mode system, it is possible to produce a difference in optical density between an irradiated spot and an unirradiated spot, as obtained in accordance with the above-mentioned first laser heat mode system, by irradiating a laser beam onto a thin film-like recording means, which has been obtained by further incorporating a compound capable or readily absorbing the laser beam and generating heat in a conventionally-known heat-sensitive recording means containing an organic polymer as a binder, a colorless or light-colored color-producing substance and a phenolic substance, and generating heat at the irradiated spot so as to produce a color there. As compounds capable of readily absorbing laser beams and generating heat which have heretofore been proposed for the second laser heat mode system, there are thionaphthol nickel complexes (see Japanese Patent Laid-open No. 121,140/1979). In order to draw out the effects of the above complexes in their entirety, it is however indispensable to employ laser beams having a wavelength at the long wavelength side of at least 1,100 nm. Thus, it is impossible to use practically-available semiconductor laser beams for them. Here again, there is a strong outstanding demand for the development of compounds which readily absorb laser beams and in turn generate heat.

Optical character recognition systems (OCR) have found their utility, particularly, as input units for computers and facsimiles. A variety of OCRs have been proposed so far, but their scanning (resolving) power of characters are not high enough. Use of laser beams as a light source of such an OCR has succeeded in greatly improving its resolving power because it makes effective use of the high focusability of laser beams and can use laser beams as a small point-source light of a spot size. When using a semiconductor laser as the light source of a scanner, it is however difficult to obtain strong contrast between light reflected by an image area such as character and an unrecorded area because images such as characters recorded with conventional ink do not absorb laser beams or, even if laser beams are absorbed, the extent of absorption is limited to a low level. It is possible to read out only characters or images recorded with a recording means containing carbon or "Nigrosine". However, neither carbon nor "Nigrosine" can be added to any conventional ink formulation. Therefore, it is difficult to read out characters or images which were recorded with an ordinary ball point pen or ink jet nozzle. Accordingly, development of reading means suitable for optical character recognition systems, which make use of a semiconductor laser as a light source for their scanner, have been awaited similar to the long standing demand for the development of recording means for the laser heat mode recording system.

With a view toward developing laser beam recording/reading means suitable to meet the aforementioned various demands, the present inventors carried out research with respect to various compounds which exhibit strong absorption of light in the near-infrared region. As a result, it was found that inorganic compounds such as phosphomolybdic acid and silicomolybdic acid are insoluble in solvents and thus unsuitable for the production of recording/reading means, and organic coloring substances such as cyanine family coloring substances are, when formed into thin films as recording/reading means, accompanied by such a drawback that their ability of absorbing light in the near-infrared region are weakened and eventually lost with the passage of time. Accordingly, the inventors' research was extended to organometallic complexes. As a result, it has been surprisingly found that benzenedithiol nickel complexes have a strong absorption band in the region of 800–950 nm and are not only soluble in organic solvents but also, when formed into thin films using an organic polymer as a binder, stable in their light absorbing ability with the passage of time. Furthermore, it has also been discovered that, upon irradiating a semiconductor laser beam of a wavelength in the region of 800–950 nm onto thin films, the benzenedithiol nickel complexes absorb the energy of the semiconductor laser beam and develop heat and, when the output of the laser beam is increased, the benzenedithiol nickel complexes are caused to evaporate together with the organic polymer. On the basis of the above findings, the present invention has been brought to completion.

An object of this invention is thus to provide a composition suitable for use in the production of such a laser heat mode recording medium and reading medium for the optical character recognition systems as mentioned above.

DISCLOSURE OF THE INVENTION

This invention provides a composition suitable for use in the production of a laser beam recording/reading means having an absorption band in the region of 800–950 nm, which composition comprises a benzenedithiol nickel complex represented by the general formula (I):

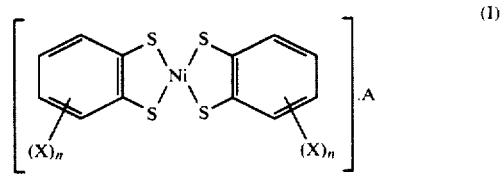

wherein X means a hydrogen, chlorine or bromine atom or a methyl group, n stands for an integer of 1–4, and A denotes a quaternary ammonium group; an organic polymer and a solvent.

The above composition may further contain a colorless or light-colored color-producing substance and an acidic substance, or a dyestuff or pigment.

BRIEF DESCRIPTION OF THE DRAWING

The drawing shows a light transmission curve representing the light transmission characteristics of a black ink composition according to this invention, which was employed in Example 4.

BEST MODE FOR CARRYING OUT THE INVENTION

The benzenedithiol nickel complexes useful in the practice of this invention are represented by the general formula (I):

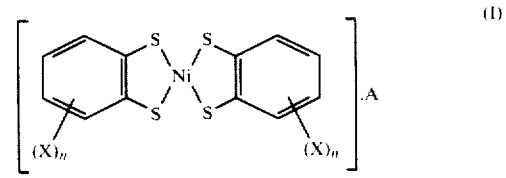

wherein X means a hydrogen, chlorine or bromine atom or a methyl group, n stands for an integer of 1–4, and A denotes a quaternary ammonium group.

These benzenedithiol nickel complexes are, upon being irradiated with laser beams of a relatively high output, capable of absorbing their energy and undergoing fusion, evaporation or sublimation, thereby making the aforementioned first laser heat mode recording feasible. On the other hand, when used for reading purposes, they permit the recognition of recorded areas from unrecorded areas and vice versa upon being irradiated with laser beams of a low output, thereby making it possible to read out recorded information with laser beams of low output.

Typical examples of benzenedithiol complexes and their molar ratio absorbance ($\epsilon$) at their corresponding absorption peak wavelengths ($\lambda$) are shown in Table 1.

TABLE 1

| Comp'd No. | Compound Name | A in formula (1) | λ (nm) | ε |
|---|---|---|---|---|
| 1 | Bis(1,2-dithiophenolate) nickel (II) tetra-n-ethyl-ammonium | $N(C_2H_5)_4$ | 890 | 13,200 |
| 2 | Bis(1-methyl-3,4-dithiophenolate) nickel (II) tetra-n-butylammonium | $N(n-C_4H_9)_4$ | 890 | 16,270 |
| 3 | Bis(1,4-dimethyl-2,3-dithiophenolate) nickel (II) trimethylcetylammonium | $N(CH_3)_3C_{16}H_{33}$ | 920 | 13,500 |
| 4 | Bis(1,2,3,4-tetramethyl-5,6-dithiophenolate) nickel (II) tetra-n-butylammonium | $N(n-C_4H_9)_4$ | 925 | 16,400 |
| 5 | Bis(1-chloro-3,4-dithiophenolate) nickel (II) tetra-n-butylammonium | $N(n-C_4H_9)_4$ | 895 | 13,960 |
| 6 | Bis(1,2,3,4-tetrachloro-5,6-dithiophenolate) nickel (II) tetra-n-butylammonium | $N(n-C_4H_9)_4$ | 885 | 15,700 |

The above compounds are obtained by reacting corresponding benzenethiols with nickel chloride and then reacting the resultant reaction liquids with their corresponding quaternary ammonium halides in accordance with the method disclosed by Halley B. Grey et al on pp. 43–50 and 4870–4875, Volume 88, Journal of The American Chemical Society. As benzenethiols, there may be employed benzene-1,2-dithiol, toluene-3,4-dithiol, xylene-4,5-dithiol, 3,4,5,6-tetramethylbenzene-1,2-dithiol, 4-chlorobenzene-1,2-dithiol, 4,5-dichlorobenzene-1,2-dithiol, 3,4,5,6-tetrachlorobenzene-1,2-dithiol and 3,4,5,6-tetrabromobenzene-1,2-dithiol. Exemplary quaternay ammonium halides may include tetraethylammonium bromide, tetrabutylammonium bromide, octyltriethylammonium bromide, cetyltriethylammonium bromide and phenyltrimethylammonium bromide.

On the other hand, as organic polymers useful in the practice of this invention, there are various natural and synthetic organic polymers having film-forming capacity. Examples of the former polymers are gelatin, cellulose derivatives, dextran, rosin, gum, and the like. As examples of the latter polymers may be mentioned synthetic resins including hydrocarbon resins such as polyethylene, polypropylene, polystyrene and polyisobutylene; vinyl resins such as polyvinyl chloride, polyvinylidene chloride and polyvinyl chloride - polyvinyl acetate copolymer; acrylic resins such as polymethylacrylate and polymethylmethacrylate; polyvinyl alcohol; chlorinated polyethylene; initial condensation products of thermosetting resins such as epoxy resin, butyral resin, rubber derivatives, and phenol-formaldehyde resin.

When incorporating a colorless or light-colored color-producing substance and acidic substance in a composition according to this invention, it is preferable to use a water-soluble polymer, for example, polyvinyl alcohol as the organic polymer. When using the composition according to this invention without such a colorless or light-colored color-producing substance and acidic substance, it is preferable to employ as the organic polymer such a polymer that promotes the evaporation of a benzenedithiol nickel complex upon exposure to laser beams, for instance, nitrocellulose or chlorinated polyethylene.

Where a composition according to this invention is used as a reading medium such as an ink formulation for OCRs and the like by further adding a dyestuff or pigment thereto, it is preferable to use as rosin or the like in a small amount as the organic polymer.

It is possible to use, as a solvent suitable in the practice of this invention, one or more solvents selected from ketone solvents such as acetone and methyl ethyl ketone; alcoholic solvents such as ethanol and isopropanol; cellosolve solvents such as methylcellosolve and ethylcellosolve; glycol ether ester solvents such as ethylene glycol monomethyl ether and diethylene glycol monomethyl ether acetate; chlorinated hydrocarbon solvents such as dichloromethane and chloroform; and water.

When incorporating a colorless or light-colored color-producing substance and acidic substance in a composition according to this invention, substances which are generally called leuco compounds and produce colors through their reactions with acidic substances may be suitably employed. Exemplary leuco compounds include triphenylmethane compounds such as 3,3-bis-(p-dimethylaminophenyl)phthalide, 3,3-bis-(p-dimethylaminophenyl)-6-dimethylaminophthalide (Crystal Violet), 3,3-bis-(p-dimethylaminophenyl)-6-diethylaminophthalide, 4-hydroxy-4'-dimethylaminotriphenylmethane lactone and 4,4'-bisdihydroxy-3,3-bis-diaminotriphenylmethane lactone; fluoran compounds such as 3-cyclohexylamino-6-chlorofluoran, 3-dimethylamino-6-methoxyfluoran, 3,6-bis-β-methoxyethoxyfluoran, 3-diethylamino-7-dibenzylaminofluoran, 3-diethylamino-6-methyl-7-chlorofluoran, 3-diethylamino-6-methyl-7-anilinofluoran and 3,7-bisdiethylaminofluoran; spiropyran compounds such as 3-methyl-di-β-naphthospiropyran and 1,3,3-trimethyl-6'-chloro-8'-methoxyindolinobenzospiropyran; auramine compounds; and rhodaminelactam compounds. On the other hand, as the acidic substance, it is possible to use a compound which is solid at room temperature but, when heated, becomes soft and fused to make the aforementioned leuco compounds produce colors, for example, 4-tertiary butyl phenol, 4-phenylphenol, 4-hydroxydiphenoxide, α-naphthol, β-naphthol, methyl-4-hydroxybenzoate, 4-hydroxyacetophenone, 4-tertiary octyl catechol, 2,2'-dihydroxydiphenyl, 2,2'-methylenebis(4-chlorophenol), 4,4'-secondary butylidenediphenol and the like.

It is suitable to proportion each component of the composition according to this invention in such a way that the benzenedithiol metal complex amounts to 1–50 wt. %, and preferably 1.5–10 wt. %, the organic polymer accounts for 1–40 wt. %, and preferably 1.5–15 wt.

%, and the solvent amounts to 10–98 wt. %, and preferably 80–97 wt. %. When incorporating a colorless or light-colored color-producing substance and acidic substance in the composition according to this invention to form a composition suitable for use in the production of a recording means for the second laser heat mode recording system, the color-producing substance and acidic substance may be incorporated in an amount of 0.1–5 wt. %, and preferably 0.2–1 wt. % and in an amount of 0.3–25 wt. %, and preferably 2–10 wt. % on the basis of the composition, respectively. When the composition according to this invention is used as a laser reading means, for example, when an OCR ink and characters or images to be read by laser beams are required to be visually legible, it is possible to further incorporate a dyestuff or pigment in the composition. The dyestuff or pigment may be added in an amount of 1–25 wt. %, and preferably 5–15 wt. % based on the composition.

Although the benzenedithiol nickel complex may be added in any suitable manner, it may be uniformly dispersed or dissolved by dissolving the complex in an organic solvent or by adding the complex as fine powder to the composition per se or by adding either one or components of the composition such as organic polymer, solvent, dyestuff, pigment or the like upon preparation of the composition or at a suitable stage subsequent to the preparation of the composition.

Next, when using the thus-prepared composition according to this invention to produce the aforementioned first laser heat mode recording medium, it is necessary to coat the composition obtained in accordance with this invention onto a substrate capable of transmitting laser beams and having resistance to heat such as a plastic film, including polyethylene terephthalate or polycarbonate film, glass substrate or the like and then to drive off its solvent to form a recording medium layer. Upon irradiating a laser beam of a wavelength in the region of 800–950 nm onto the thus-formed recording medium layer, the benzenedithiol nickel complex is caused to evaporate together with the organic polymer at such spots that have been irradiated by the laser beam, thereby leaving a record of transparent dots which have been formed at the irradiated spots. In order to read out the thus-recorded dots by directing a reading laser beam thereto and recognizing differences in the intensity of reflected light, it is necessary to deposit a metal film on a substrate by evaporation and then to coat the recording means-forming composition according to this invention thereon so that a recording medium layer is formed.

Furthermore, laser beam-irradiated spots may be used as thick-colored dots for recording purposes by coating a composition, which has been obtained by incorporating a heat-sensitive color-producing system, for example, a conventional color-producing system for heat-sensitive recording media such as Crystal Violet Lactone and bisphenol A in a composition obtained according to this invention, on a substrate and causing its solvent to evaporate so as to form a recording medium layer and then irradiating the recording medium layer with a laser beam having a wavelength in the region of 800–950 nm, because the heat-sensitive color-producing system develops a color at the laser beam-irradiated spots owing to the absorption of the laser beams and generation of heat by the benzenedithiol nickel complex.

On the other hand, when using the composition obtained in accordance with this invention as a laser beam reading means, the composition may for example be used as an ink formulation so as to write characters or the like as a record on a substrate which is to be exposed to reading laser beams. By irradiating a semiconductor laser beam having a wavelength in the range of 800–950 nm onto the substrate, the laser beam is reflected by the substrate and a measurement of the intensity of the thus-reflected laser beam gives an extremely large difference (S/N ratio) between the recorded spots, where characters or the like are recorded, and the remaining nonrecorded spots. Such a large difference makes reading possible without need for any special reading medium containing carbon black or "Nigrosine".

The present invention will hereinafter be described in detail by the following examples, in which all designations of parts refer to parts by weight.

EXAMPLE 1

A composition was prepared by combining 70 parts of methyl ethyl ketone, 10 parts of chlorinated polyethylene (product of Sanyo Kokusaku Pulp Co., Ltd.; "Superchlon 907HA"), and 30 parts of tetrahydrofuran containing 2 parts of bis(1,2,3,4-tetramethyl-5,6-dithiophenolate)nickel (II) tetra-n-butylammonium dissolved therein and then dispersing them thoroughly in a paint shaker. The thus-prepared composition was coated on a polyethylene terephthalate film to give a solid weight of 1.0 g/m$^2$. A straight line was then drawn on the thus-obtained recording film by irradiating a focused semiconductor laser beam (GaAs junction laser; intensity of incident beam: 5 mW) from the coated surface. For the sake of comparison, a recording film was prepared in the same way as above except that 3 parts of carbon black were used in place of 3 parts of bis(1,2,3,4-tetramethyl-5,6-dithiophenolate) nickel (II) tetra-n-butylammonium. A straight line was similarly drawn on the recording film by irradiating a laser beam thereonto. An electron microscopic observation of both straight lines indicated that use of bis(1,2,3,4-tetramethyl-5,6-dithiophenolate)nickel (II) tetra-n-butylammonium gave an extremely sharp and well-contrasted straight line whereas use of carbon black resulted in an uneven and unclear track.

EXAMPLE 2

Solution A was prepared by adding 30 parts of Crystal Violet Lactone to 150 parts of a 10% aqueous solution of polyvinyl alcohol and then dispersing them in a paint shaker. Solution B was also prepared by dispersing 300 parts of a 10% aqueous solution of polyvinyl alcohol, 100 parts of water, 30 parts of bisphenol A and 30 parts of bis(1-methyl-3,4-dithiophenolate)nickel (II) tetra-n-butylammonium in a paint shaker. Five parts of Solution A were then combined with 100 parts of Solution B to give a composition, which was then coated on high quality paper to give a solid weight of 10 g/m$^2$. A straight line was drawn by irradiating a focused semiconductor laser beam (GaAs junction laser; intensity of incident beam: 5 mW) onto the coated surface of the thus-prepared heat-sensitive recording paper. For the sake of comparison, a laser beam was similarly irradiated onto a sheet of recording paper, which had been obtained in the same way as above except for the exclusion of 30 parts of bis(1-methyl-3,4-dithiophenolate)nickel (II) tetra-n-butylammonium, to draw a straight line. A clear straight line was visually observed with the former recording paper, i.e., the recording paper making use of bis(1-methyl-3,4-dithiophenolate)nickel (II) tetra-n-butylammonium whereas the latter recording paper, i.e., the recording paper without bis(1-methyl-3,4-dithiophenolate)nickel (II) tetra-n-butylammonium gave a track of the laser beam which track was so unclear that it was recognized only by an electron microscope.

EXAMPLE 3

The compositions prepared as a composition according to this invention and for the sake of comparison in Example 1, respectively, were each coated on a sheet of high quality paper to give a solid weight of 1.0 g/m², thereby providing reading media. Then, a semiconductor laser beam (GaAs junction laser; intensity of incident beam: 5 mW) was irradiated at an angle of 45° onto each of three papers, i.e., uncoated high quality paper, paper coated with the former composition which contained bis(1,2,3,4-tetramethyl-5,6-dithiophenolate)-nickel (II) tetra-n-butylammonium, and paper coated with the latter composition which contained carbon black, from the coated surfaces. Reflected laser beams were measured by means of a photomultiplier tube. As a result, supposing the intensity of the beam reflected by the uncoated high quality paper to be 100, the intensity of the beam reflected by the former coated paper employing bis(1,2,3,4-tetramethyl-5,6-dithiophenolate)-nickel (II) tetra-n-butylammonium was 5–8 while the latter coated paper using carbon black gave 25–30 as the intensity of the beam reflected by itself.

EXAMPLE 4

A composition suitable for a reading means was prepared by mixing 2 parts of bis(1-chloro-3,4-dithiophenolate) nickel (II) tetra-n-butylammonium, 5 parts of rosin resin and 55 parts of ethylene glycol monomethyl ether in a paint shaker. The thus-prepared composition was thereafter added with 10 parts of "C.I. Acid Black 123", 1 part of "C.I. Solvent Yellow 19", 15 parts of benzyl alcohol, 11 parts of n-butanol and 1 part of "Futargent 200" (a fluorine-type ionic surfactant; product of Neos Corporation) to obtain a black ink formulation. The thus-obtained ink formulation was then coated onto a polyethylene terephthalate film of 0.1 mm thick to give a solid weight of 10 g/m². The light transmission of the thus-obtained test piece was then determined using a multi-purpose automatic spectrophotometer (manufactured by Shimazu Seisakusho Ltd.). As a result, a light transmission curve was obtained as shown in FIG. 1.

We claim:

1. Laser beam recording method which comprises irradiating a semiconductor laser beam of a wavelength of 800 to 950 NM onto a recording means which comprises a recording medium layer coated on a substrate, said layer comprising a benzenedithiol nickel complex represented by general formula (I):

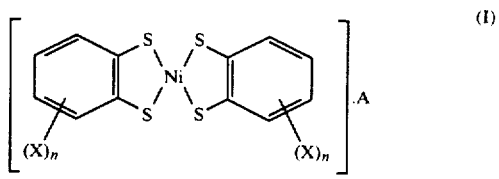

wherein X is a hydrogen atom, a chlorine atom, a bromine atom or a methyl group, N is an integer of 1 to 4, and A is a quaternary ammonium group, and an organic polymer, thereby fusing, evaporating or sublimating the benzenedithiol nickel complex at the irradiated parts in the recording medium layer.

2. Laser beam recording method according to claim 1 wherein the organic polymer is nitrocellulose or chlorinated polyethylene.

* * * * *